(12) United States Patent
Ramanujam et al.

(10) Patent No.: US 11,834,108 B2
(45) Date of Patent: Dec. 5, 2023

(54) DYNAMIC VEHICLE MODEL BASED ASSIST WITHOUT TORQUE SENSOR

(71) Applicant: STEERING SOLUTIONS IP HOLDING CORPORATION, Saginaw, MI (US)

(72) Inventors: Rangarajan Ramanujam, Saginaw, MI (US); Mariam S. George, Lake Orion, MI (US); Anthony J. Champagne, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 292 days.

(21) Appl. No.: 17/107,934

(22) Filed: Nov. 30, 2020

(65) Prior Publication Data
US 2022/0169306 A1 Jun. 2, 2022

(51) Int. Cl.
*B62D 6/00* (2006.01)
*B60W 40/068* (2012.01)
*B62D 5/04* (2006.01)

(52) U.S. Cl.
CPC ................... *B62D 5/0463* (2013.01)

(58) Field of Classification Search
CPC ...... B62D 5/0463; B62D 6/008; B62D 6/006; B62D 1/00; B62D 3/12; B62D 6/001; B62D 6/003; B62D 6/005; B60W 40/068; B60G 2400/0523; B60T 2250/03; B60T 2270/313
See application file for complete search history.

(56) References Cited

U.S. PATENT DOCUMENTS

| | | | |
|---|---|---|---|
| 9,409,595 B2 | 8/2016 | Varunjikar et al. | |
| 9,550,523 B2 | 1/2017 | George et al. | |
| 9,845,109 B2 | 12/2017 | George et al. | |
| 10,144,445 B2 | 12/2018 | Varunjikar et al. | |
| 10,155,531 B2 | 12/2018 | Champagne et al. | |
| 11,498,613 B2 | 11/2022 | Varunjikar et al. | |
| 11,511,790 B2 | 11/2022 | George et al. | |
| 2010/0131144 A1* | 5/2010 | Ryu .................... | B60W 40/103 701/79 |
| 2016/0288830 A1* | 10/2016 | Hori ..................... | B62D 15/025 |
| 2019/0001988 A1* | 1/2019 | Ienaga ............. | G08G 1/096775 |
| 2019/0092335 A1* | 3/2019 | Kim ....................... | B62D 6/008 |

FOREIGN PATENT DOCUMENTS

| | | | | |
|---|---|---|---|---|
| EP | 2218621 A1 * | 8/2010 | ............. | B60T 8/172 |
| JP | 5731875 B2 * | 6/2015 | | |
| KR | 20180096235 A * | 8/2018 | ............ | B60W 40/06 |
| WO | WO-2015153811 A1 * | 10/2015 | ......... | B60G 17/0195 |
| WO | WO-2017204043 A1 * | 11/2017 | ............. | B60T 8/172 |

* cited by examiner

*Primary Examiner* — Jonathan L Sample
*Assistant Examiner* — Byron Xavier Kasper
(74) *Attorney, Agent, or Firm* — Dickinson Wright PLLC

(57) ABSTRACT

A method for generating torque assist includes determining a model yaw rate value based on a vehicle speed, a steering angle, and a road-friction coefficient value and determining a differential yaw rate value using a difference between the model yaw rate value and a vehicle yaw rate value. The method also includes determining an updated road-friction coefficient value using at least the differential yaw rate value and generating a torque assist value based on the updated road-friction coefficient value and a model rack force value.

20 Claims, 6 Drawing Sheets

DYNAMIC VEHICLE MODEL BASED ASSIST WITHOUT TORQUE SENSOR

TECHNICAL FIELD

This disclosure related to vehicle models and in particular to dynamic vehicle models based assist without a torque sensor.

BACKGROUND OF THE INVENTION

Vehicles, such as cars, trucks, sport utility vehicles, crossovers, mini-vans, marine craft, aircraft, all-terrain vehicles, recreational vehicles, or other suitable vehicles, may include a steering system. Such steering systems typically include an electric motor for providing steering assist during operation of a vehicle.

During operation of such a vehicle, various forces may result in vehicle acceleration/deceleration or turning. Such forces may originate at a tire-road interface. In some situations, tire forces may be generated by a longitudinal and/or lateral tire slip that creates a tire force between the tire and road. Typically, a road friction coefficient is the primary factor affecting a maximum tire force. Accordingly, information relating to the road friction coefficient may be useful for vehicle control.

SUMMARY OF THE INVENTION

An aspect of the disclosed embodiments includes a method for generating torque assist. The method includes determining a model yaw rate value based on a vehicle speed, a steering angle, and a road-friction coefficient value and determining a differential yaw rate value using a difference between the model yaw rate value and a vehicle yaw rate value. The method also includes determining an updated road-friction coefficient value using at least the differential yaw rate value and generating a torque assist value based on the updated road-friction coefficient value and a model rack force value.

Another aspect of the disclosed embodiments includes a system for generating torque assist. The system includes a processor and a memory. The memory includes instructions that, when executed by the processor, cause the processor to: determine a model yaw rate value based on a vehicle speed, a steering angle, and a road-friction coefficient value; determine a differential yaw rate value using a difference between the model yaw rate value and a vehicle yaw rate value; determine an updated road-friction coefficient value using at least the differential yaw rate value; and generate a torque assist value based on the updated road-friction coefficient value and a model rack force value.

Another aspect of the disclosed embodiments includes an apparatus for generating torque assist. The apparatus includes a processor and a memory. The memory includes instructions that, when executed by the processor, cause the processor to: determine a model yaw rate value based on a vehicle speed, a steering angle, and a road-friction coefficient value; determine a differential yaw rate value using a difference between the model yaw rate value and a vehicle yaw rate value; determine an updated road-friction coefficient value using the differential yaw rate value and at least one of a yaw rate error value and a lateral acceleration error value; generate a torque assist value based on the updated road-friction coefficient value and a model rack force value; and, in response to a determination that a difference between the road-friction coefficient value and the updated road-friction coefficient value is greater than a threshold, adjust a steering system maneuver value.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
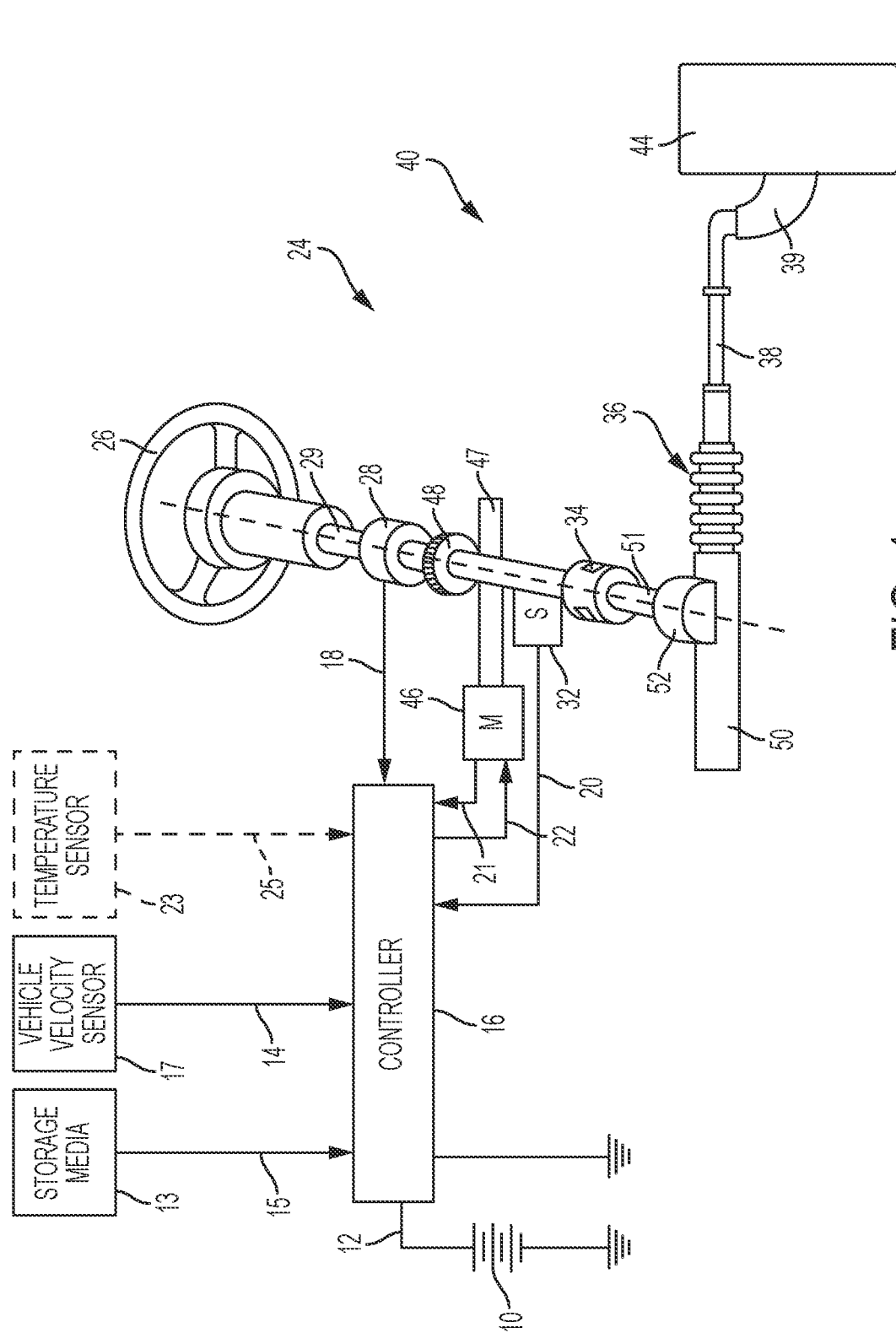
FIG. 1 generally illustrates a first type of steering system for implementing the described embodiments according to the principles of the present disclosure.

Vehicles, such as cars, trucks, sport utility vehicles, crossovers, mini-vans, marine craft, aircraft, all-terrain vehicles, recreational vehicles, or other suitable vehicles, may include a steering system. Such steering systems typically include an electric motor for providing steering assist during operation of a vehicle.

During operation of such a vehicle, various forces may result in vehicle acceleration/deceleration or turning. Such forces may originate at a tire-road interface. In some situations, tire forces may be generated by a longitudinal and/or lateral tire slip that creates a tire force between the tire and road. Typically, a road friction coefficient is the primary factor affecting a maximum tire force. Accordingly, information relating to the road friction coefficient may be useful for vehicle control.

Typically, steering systems, such as electronic power steering systems (EPS) or other suitable steering systems, use a torque sensor to determine an operator requested assist of the steering system. In cases where functionality of such a torque sensor is diminished, the steering system may not provide the requested assist (e.g., causing a loss of assist to the operator).

Increasingly, additionally sensors are being added to typical vehicles (e.g., dual electronic control unit systems and the like), which may increase the likelihood that functionality of a sensor may be diminished during operation of the vehicle. Typically, redundant sensors may be used to accommodate such diminished functionality. However, using redundant sensors may increase costs and/or may require additional resources.

Accordingly, systems and methods, such as those described herein, that are configured to estimate a surface friction coefficient without using a torque sensor, may be desirable. In some embodiments, the systems and methods described herein may be configured to utilize the estimated surface friction coefficient to dynamically update a model rack force output, which may provide an improved base assist of the steering system.

In some embodiments, the systems and methods described herein may be configured to estimate road friction coefficient a without the use of steering handwheel torque. The systems and methods described herein may be configured to use a reference yaw rate and/or a lateral acceleration from the vehicle. The systems and methods described herein may be configured to use a relatively complex vehicle model to predict yaw rate to compute reference steering loads.

In some embodiments, the systems and methods described herein may be configured to compare the predicted or estimated yaw rate to the calculated yaw rate. The systems and methods described herein may be configured to compare the predicted or estimated lateral acceleration with a calculated lateral acceleration. The systems and methods described herein may be configured to estimate (e.g., or predict) a road friction coefficient based on at least one of the comparison of the predicted or estimated yaw rate to the calculated yaw rate and the comparison of the predicted or estimated lateral acceleration with the calculated lateral acceleration.

In some embodiments, the systems and methods described herein may be configured to update steering loads predicted from the relatively complex vehicle model using the estimated road friction coefficient. The systems and methods described herein may be configured to use the updated steering loads to provide torque assistance in the absence of a torque sensor (e.g., or during a diminished operating condition of the torque sensor).

In some embodiments, the systems and methods described herein may be configured to use a model based rack force prediction with inbuilt robustness to changing surface friction. In some embodiments, the systems and methods described herein may be configured to predict surface friction with existing vehicle signals (e.g., without a torque sensor). In some embodiments, the systems and methods described herein may be configured to estimated μ (e.g., road friction coefficient). In some embodiments, the systems and methods described herein may be configured to use the estimated road friction coefficient to modify steering efforts in a closed-loop EPS, a steer-by-wire (SbW) system, and/or a magnetic torque overlay (MTO) steering system. In some embodiments, the systems and methods described herein may be configured to use the estimated road friction coefficient to apply steering torque overlay to assist the operator in avoiding a high slip angle zone. In some embodiments, the systems and methods described herein may be configured to use the estimated road friction coefficient to broadcast output for other modules (ESC, brakes, and the like).

In some embodiments, the systems and methods described herein may be configured to use the estimated road friction coefficient to send information to a vehicle to vehicle network, vehicle to Internet network, and the like. In some embodiments, the systems and methods described herein may be configured to use the estimated road friction coefficient to plan a trajectory for autonomous vehicles. In some embodiments, the systems and methods described herein may be configured to fuse the estimated road friction coefficient to with a longitudinal friction coefficient.

In some embodiments, the systems and methods described herein may be configured to determine a model yaw rate value based on a vehicle speed, a steering angle, and a road-friction coefficient value. The systems and methods described herein may be configured to determine a differential yaw rate value using a difference between the model yaw rate value and a vehicle yaw rate value. The systems and methods described herein may be configured to determine an updated road-friction coefficient value using at least the differential yaw rate value. The systems and methods described herein may be configured to generate a torque assist value based on the updated road-friction coefficient value and a model rack force value.

In some embodiments, the systems and methods described herein may be configured to determine the updated road-friction coefficient value by determining, using one or more adaptive filters, a yaw rate error value corresponding to an estimated sensor error associated with measuring the vehicle yaw rate value. The systems and methods described herein may be configured to determine the updated road-friction coefficient value based on the differential yaw rate value and the yaw rate error value.

In some embodiments the systems and methods described herein may be configured to determine the updated road-friction coefficient value by determining, using one or more adaptive filters, a lateral acceleration error value corresponding to an estimated sensor error associated with measuring a lateral acceleration of a vehicle. The systems and methods described herein may be configured to determine the updated road-friction coefficient value based on the differential yaw rate value and the lateral acceleration error value.

In some embodiments, the systems and methods described herein may be configured to determine the updated road-friction coefficient value by determining, using one or more adaptive filters, a yaw rate error value corresponding to a first estimated sensor error associated with measuring the vehicle yaw rate value and by determining, using the one or more adaptive filters, a lateral acceleration error value corresponding to a second estimated sensor error associated with measuring a lateral acceleration of a vehicle. The systems and methods described herein may be configured to determine the updated road-friction coefficient value based on the differential yaw rate value, the yaw rate error value, and the lateral acceleration error value.

In some embodiments, the systems and methods described herein may be configured to, prior to determining the model yaw rate value, determine the road-friction coefficient value based on a first sensor value indicating a first road-friction condition. The systems and methods described herein may be configured to determine the updated road-friction coefficient value by determining the updated road-friction coefficient value based at least in part on the differential yaw rate value and a second sensor value indicating a second road-friction condition. The second road-friction condition may be different than the first road-friction condition.

In some embodiments, the systems and methods described herein may be configured to determine the updated road-friction coefficient value based on a state of an update flag. The update flag may set based on at least one steering system signal. In some embodiments, the update flag may indicate a torque sensor condition. In some embodiments, the systems and methods described herein may be configured to communicate the updated road-friction coefficient value to an advanced driver-assistance system. The systems and methods described herein may be configured to, in response to a determination that a difference between the road-friction coefficient value and the updated road-friction coefficient value is greater than a threshold, adjust a steering system maneuver value FIGS. 1 and 2 generally illustrate an EPS system 40 of a vehicle 100 according to the principles of the present disclosure. The EPS system 40 may include a steering mechanism 36. The steering mechanism 36 may include a rack-and-pinion type system, which may include a toothed rack (not shown) within housing 50 and a pinion gear (also not shown) located under gear housing 52. As the operator input device, hereinafter denoted as a handwheel or handwheel 26, is turned, an upper steering shaft 29 turns and a lower steering shaft 51, connected to the upper steering shaft 29 through a universal joint 34, turns a pinion gear. Rotation of the pinion gear moves a rack, which moves one or more tie rods 38, which in turn move steering knuckles 39. As steering knuckles 39 turn, one or more steerable wheels or tires 44 are turned. Although a rack-and-pinion type system is described herein, the EPS 40 may include any suitable mechanism, such as a column assist EPS (CEPS), pinion assist EPS (PEPS), dual pinion assist EPS, or any other type of EPS.

Electric power steering assist is provided through the control apparatus generally designated by reference numeral 24 and includes the controller 16 and an electric motor 46, which could be a permanent magnet synchronous motor (PMSM), or a permanent magnet direct current motor (PMDC), or any other type of motor, and is hereinafter denoted as motor 46. The controller 16 is powered by the vehicle power supply 10 through line 12. The controller 16 receives a vehicle speed signal 14 representative of the vehicle velocity from a vehicle velocity sensor 17.

Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21.

A motor velocity denoted $\omega m$ may be measured, calculated or a combination thereof. For example, the motor velocity $\omega m$ may be calculated as the change of the motor position $\theta$ as measured by a position sensor 32 over a prescribed time interval. For example, motor speed $\omega m$ may be determined as the derivative of the motor position $\theta$ from the equation $\omega m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the handwheel 26 is turned, torque sensor 28 senses the torque applied to the handwheel 26 by the vehicle driver. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller 16 sends a command 22 to the electric motor 46, which supplies torque assist to the steering system through worm 47 and worm gear 48, providing torque assist to the vehicle steering. As will be described, in some embodiments, the EPS system 40 may provide torque assist to the operator or driver in situations where the torque sensor 28 is unable to measure the torque applied to the handwheel 26 by the driver.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24, the controller 16 utilizes the torque, position, and speed, and like, to compute a command(s) to deliver the required output power. The controller 16 is disposed in communication with the various systems and sensors of the motor control system. The controller 16 receives signals from each of the system sensors, quantifies the received information, and provides an output command signal(s) in response thereto, in this instance, for example, to the motor 46.

The controller 16 is configured to develop the corresponding voltage(s) out of inverter (not shown), which may optionally be incorporated with controller 16 and will be referred to herein as controller 16, such that, when applied to the motor 46, the desired torque or position is generated. In some embodiments, the control system 24 operates in a feedback control mode, as a current regulator, to generate the command 22.

Additionally, or alternatively, the control system 24 operates in a feedforward control mode to generate the command 22. Because these voltages are related to the position and speed of the motor 46 and the desired torque, the position and/or speed of the rotor and the torque applied by a driver are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the foregoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. The torque sensor 28 and the torque signal(s) 18 therefrom, as may be responsive to a compliant torsion bar, T-bar, spring, or similar apparatus (not shown) may configured to provide a response indicative of the torque applied.

In some embodiments, a temperature sensor(s) 23 may be located at the electric motor 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

Figure 2:
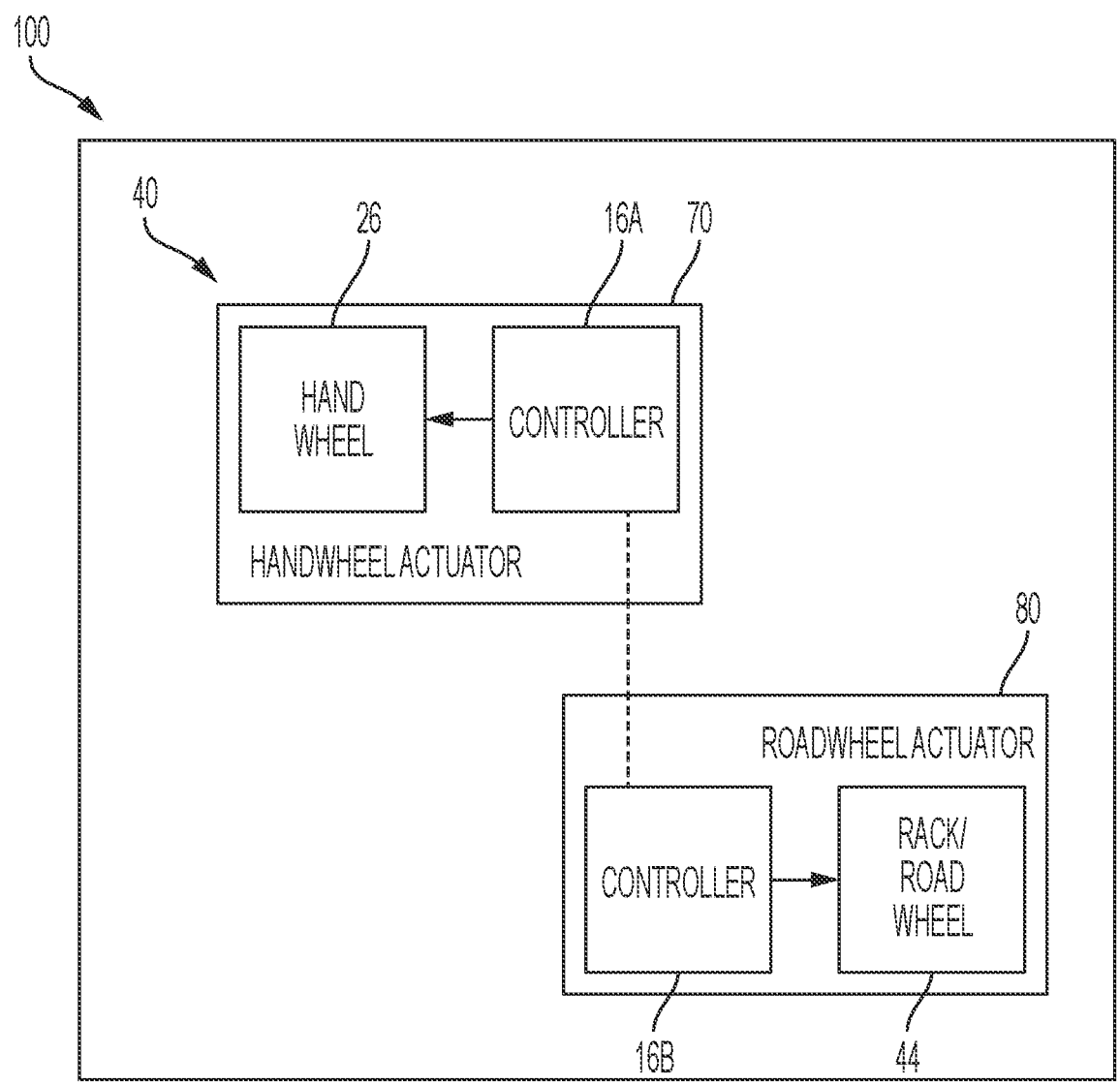
FIG. 2 generally illustrates another type of steering system for implementing the described embodiments according to the principles of the present disclosure.

FIG. 2 depicts another type of steering system 40 for implementing one or more embodiments according to the principles of the present disclosure. Specifically, FIG. 2 depicts a Steer-by-Wire (SbW) system 40 that includes a handwheel actuator (HWA) 70 and a roadwheel actuator (RWA) 80. The controller 16 is split into two blocks, a controller 16A and a controller 16B associated with the HWA 70 and the RWA 80 respectively. While FIG. 1 and FIG. 2 refer to the steering system 40 as an EPS system 40 and an SbW system 40, respectively, it is to be understood that these are provided by way of example. In practice, the steering system 40 may be any type of steering system capable of implementing the one or more described embodiments.

The HWA 70 includes one or more mechanical components, such as the handwheel 26 (handwheel), a steering column, a motor/inverter attached to the steering column either through a gear mechanism or a direct drive system. The HWA 70 further includes the microcontroller 16A that controls the operation of the mechanical components. The microcontroller 16A receives and/or generates torque via the one or more mechanical components. For example, the microcontroller 16A can send a torque command request to a motor/inverter that will generate such torque.

The RWA 80 includes one or more mechanical components, such as a steering rack coupled to a motor/inverter through a ball-nut/ball-screw (gear) or pinion gear arrangement, and the rack is connected to the vehicle roadwheels/tires 44 through tie-rods. The RWA 80 includes the microcontroller 16B that controls the operation of the mechanical components. The microcontroller 16B receives and/or generates torque via the one or more mechanical components. For example, the microcontroller 16B can send a torque command request to a motor/inverter that will generate such torque.

The microcontrollers 16A and 16B are coupled through electrical connections that allow signals to be transmitted/received. As referred to herein, a controller can include a combination of the HWA controller 16A and the RWA controller 16B, or any one of the specific microcontrollers.

In some embodiments, the controllers 16A and 16B and the steering system 40 communicate with each other through CAN interface (or other similar digital communication protocols). Guidance of the vehicle 100 that is fitted with the SbW system 40 is performed by use of the steering gear. The RWA 80 receives an electronic communication signal of rotation of the handwheel by the driver. A driver controls the handwheel to directionally control the vehicle 100. The angle from HWA 70 is sent to the RWA 80 which performs position control to control rack travel to guide the roadwheel. However, due to the lack of mechanical connection between the handwheel and the roadwheels, the driver is not readily provided with a feel for the road without torque feedback (unlike the case in an EPS as described earlier).

In some embodiments, the HWA 70 that is coupled to the steering column and handwheel simulates the driver's feel of the road. The HWA 70 may apply tactile feedback in the form of torque to the handwheel. The HWA 70 receives a rack force signal from the RWA 80 to generate an appropriate torque feel for the driver. Alternatively, the handwheel angle and vehicle speed can also be used to generate desired torque feel to the driver.

As noted earlier, the SbW and EPS described herein are exemplary, and the technical solutions described herein are applicable to any type of a steering system, and as such, unless specifically mentioned otherwise, a "steering system 40" herein refers to any type of steering system.

Figure 3:
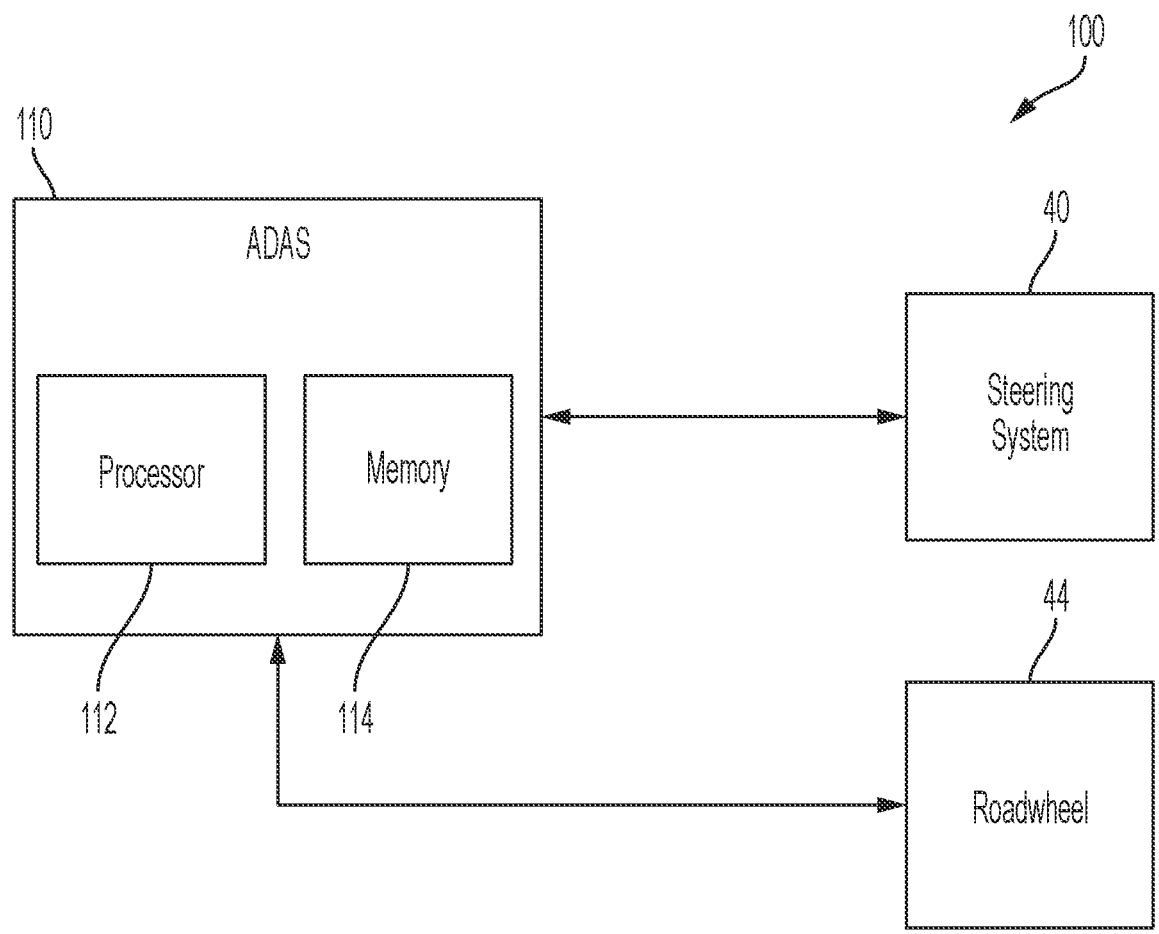
FIG. 3 generally illustrates an automated driver assistance system according to the principles of the present disclosure.

FIG. 3 depicts an automated driver assistance system according to one or more embodiments. It will be appreciated that the steering system 40 shown and described can be used in an autonomous or semi-autonomous vehicle or in a more conventional vehicle. An advanced drive assistance system (ADAS) 110 can be coupled with the steering system 40, the roadwheels 44 (via one or more control unit), and other control units in the vehicle 100. The ADAS 110 can include one or more processors 112 and one or more memory devices 114. The ADAS 110 receives one or more input signals including data and/or commands from the control units, such as the controller 16 of the steering system 40. The ADAS 110 can further send signals including data and/or commands to the control units, such as the controller 16 of the steering system 40. The ADAS 110 can further receive input from the human driver, such as a destination, one or more preferences and the like. The ADAS 110 can provide notifications to the driver, such as during an interaction with the driver, and/or in response to one or more conditions in the vehicle 100.

The ADAS 110, in some embodiments, determines a trajectory of travel for the vehicle 100 automatically. The trajectory can be generated based on an input from the driver and based on one or more input signals received from the control units, such as the road-friction coefficient. Additionally, or alternatively, the ADAS 110 can be in communication external modules (not shown) such as traffic servers, road map servers and the like to generate a route/path for the vehicle 100 from a source to a destination. The ADAS 110 sends one or more commands to the control units to maneuver the vehicle based on the generated route and/or trajectory. It should be noted that while a "route" is a high-level mapping for the vehicle to reach a destination location on a map (e.g. home, office, and restaurant) from a source location, a "trajectory" is a specific set of maneuvers to be performed for the vehicle 100 to move from its present position to a next position on the route. The ADAS 110 can perform maneuvers that can include changes to, but not limited to, vehicle direction, vehicle speed, vehicle acceleration, and the like. To perform such maneuvers, the ADAS 110 sends one or more commands to the corresponding control unit(s).

Regardless of whether the vehicle 100 is being driven using an ADAS 110 or manually by a driver, maneuvering the vehicle 100 is generally performed based on a road-friction coefficient value, which determines maximum tire grip in lateral and longitudinal direction. The road-friction coefficient is crucial information for vehicle handling (manual & autonomous). Although a human driver may not see the numeric value of the coefficient during the maneuvers, s/he feels the "dry," "wet," "snowy," and other such types of surfaces because of varied road-friction coefficient of such surfaces when driving the vehicle 100, and typically, maneuvers the vehicle 100 accordingly. The ADAS 110 may maneuver the vehicle 100 based on a road-friction coefficient value. Henceforth, in the present document, the term "operator" is used to refer to both the human driver and the ADAS 110, both of which can maneuver the vehicle 100 based on the road-friction coefficient.

The quicker a change in the road-friction coefficient value can be detected and indicated to the operator, the quicker the operator can react and maneuver the vehicle 100 differently. For example, if the vehicle moves from a dry surface to a slippery surface (e.g. ice patch), the vehicle 100 has to be maneuvered differently to avoid skidding; for example, the vehicle's stability control may engage for smaller steering and/or braking inputs on a slippery road compared to dry road.

Figure 4:
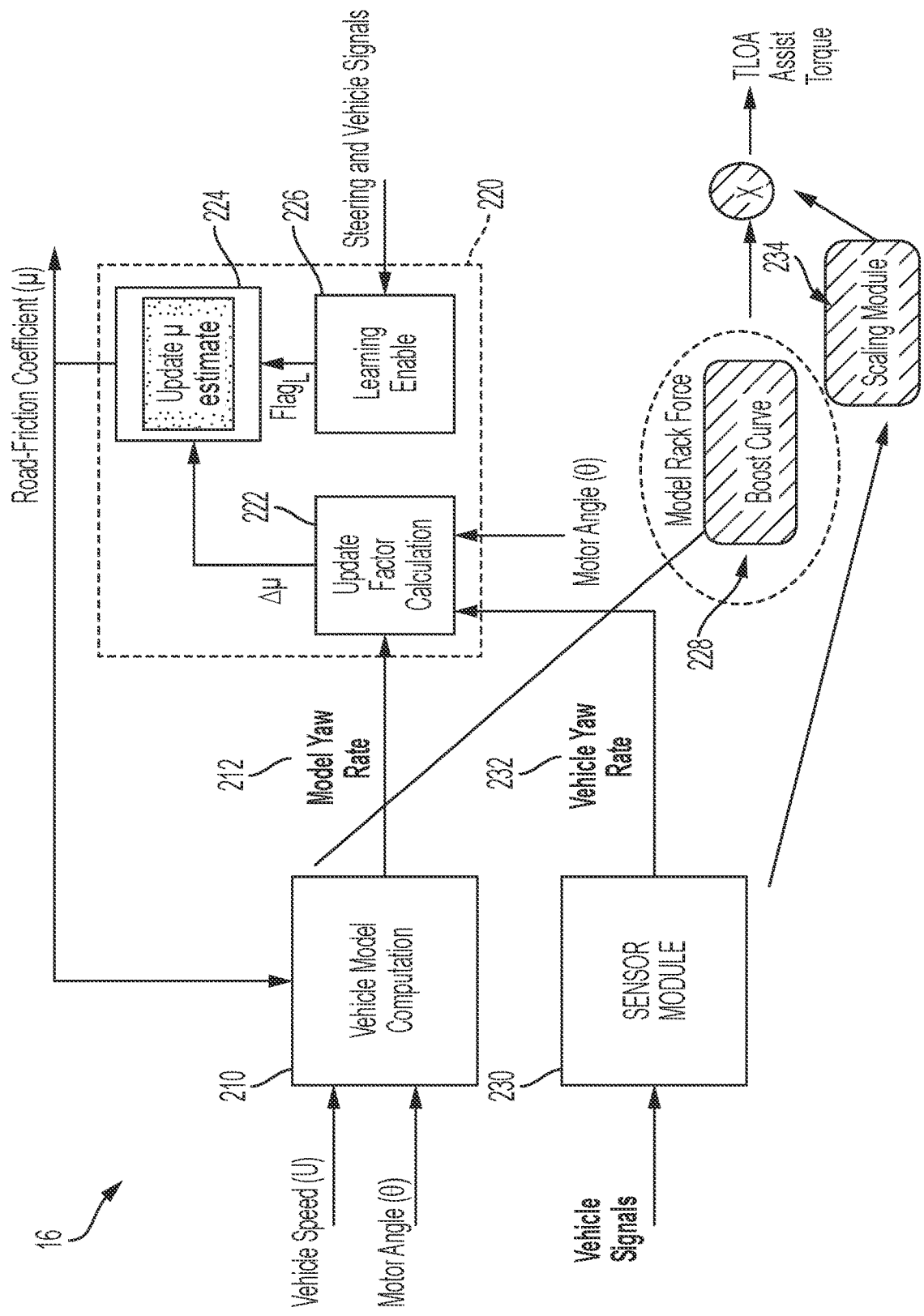
FIG. 4 generally illustrates a block diagram of a steering system according to the principles of the present disclosure.

FIG. 4 depicts a block diagram of the controller 16 for continuously and iteratively updating a road-friction coefficient value according to the principles of the present disclosure. For example, the controller 16 may continuously update the road-friction coefficient value such that the controller 16 is able to provide torque assist to an operator of a vehicle (e.g., a driver, an autonomous driving system, etc.) in situations where a torque sensor of the vehicle is unable to measure driver torque.

The controller 16 may, for example, include a processor and a memory storing instructions that, when executed by the processor, allow the controller 16 to iteratively update the road-friction coefficient value. The processor may include any suitable processor, such as those described herein. Additionally, or alternatively, the compensation controller 16 may include any suitable number of processors, in addition to or other than the processor. The memory may comprise a single disk or a plurality of disks (e.g., hard drives), and includes a storage management module that manages one or more partitions within the memory. In some embodiments, memory may include flash memory, semiconductor (solid state) memory or the like. The memory may include Random Access Memory (RAM), a Read-Only Memory (ROM), or a combination thereof. The memory may include instructions that, when executed by the processor, cause the processor to, at least, perform the various methods described herein. While one or more embodiments include functionality performed by the controller 16, it is to be understood that this is provided by way of example. In practice, functionality relating to one or more described embodiments may be performed by another controller or processor associated with the vehicle, such as a controller of the ADAS 110 or another suitable controller or processor.

In some embodiments, as shown by reference number 402, the controller 16 may determine a model yaw rate value. For example, the controller 16 may have access to a vehicle model configured to determine a model yaw rate value based on received inputs. The model yaw rate value represents an estimated angular velocity around a vertical axis of the vehicle. The vehicle model is a non-linear model that can be used to compute the model yaw rate value using slip angles.

In some embodiments, the controller 16 may determine a model yaw rate value based on a speed value (U) indicating a vehicle speed, a steering angle value (θ) indicating steering angle (handwheel position or motor angle) measured by the steering system 40, and a road-friction coefficient value ($\hat{\mu}$). The road-friction coefficient value ($\hat{\mu}$) may be an estimated value (e.g., output by road-friction coefficient computation 220) from a previous iteration, $\hat{\mu}$, which is updated iteratively. The speed value (U) may be received from a sensor configured to sense or measure the speed of the vehicle 100. A description of how the controller 16 determines the model yaw rate value is provided in connection with FIG. 5.

The controller 16 may include a vehicle model computation 210. The vehicle model computation 210 uses a predetermined vehicle model to compute a model yaw rate 212. The vehicle model is a nonlinear vehicle model that computes the model yaw rate 212 using a vehicle speed, a motor angle, and/or a road-friction coefficient.

The vehicle model computation 210 may include a module for slip angle computation. In some embodiments, the slip angle computation 310 uses bicycle model with road-friction (μ) dependent nonlinear tire force curves and tire lag dynamics to obtain a front axle slip angle (αf). As noted earlier, the road-friction coefficient used as input is an estimated value (i.e. output of an updated road-friction coefficient estate 224 (depicted as update μ estimate 224 in FIG. 4)) from a previous iteration, $\hat{\mu}$, which is updated iteratively. The slip angle αf along with predicted road friction coefficient $\hat{\mu}$, a vehicle speed (U), and a motor angle (θ) (e.g., also referring to as a steering angle) is used to generate the model yaw rate 212.

The slip angle computation may use the steering angle (θ) (handwheel position or motor angle) measured by the steering system 40. The steering angle is converted to a tire angle using look up tables or a multiplier. Bicycle model equations are used to calculate yaw rate and lateral velocity states. The yaw dynamics equation that can be used includes:

$$I_{zz}\dot{r}=aF_{cf}-bF_{cr}$$

Further, a lateral dynamics equation that can be used includes:

$$m(\dot{V}+rU)=F_{cf}+F_{cr}$$

In the above equations, Izz: Rotational inertia, r: Yaw Rate, a: distance between center of gravity (CG) and front axle, b: distance between CG and rear axle, V: Lateral velocity at CG, U: Longitudinal velocity at CG, Fcf: Front axle force, and Fcr: Rear axle force.

Referring to FIG. 4, the model yaw rate 212 is provided to the road-friction coefficient computation 220. Additionally, or alternatively, the road-friction coefficient computation 220 receives a yaw rate 232 from the sensor module 230. The sensor module 230 may receive various vehicle and steering signals from the vehicle 100 and/or steering system 40. For example, the sensor module 230 may receive a reference yaw rate and/or lateral acceleration over the vehicle CAN bus. The sensor module 230 may perform advanced processing techniques to the signals in order to provide the yaw rate 232 to the road-friction coefficient computation 220.

In some embodiments, the vehicle yaw rate 232 is computed using a rack force observer that uses steering signals such as steering motor torque and steering velocity (for EPS) to calculate the vehicle yaw rate 232. The vehicle yaw rate 232 is a virtual rack force calculated from driver and motor efforts which are measured and/or estimated. Accordingly, the yaw rate 232 is a reference to which the model yaw rate 212 is compared.

In some embodiments, the road-friction coefficient computation 220 is performed based on least-mean square (LMS) filtering, however, other equivalent filtering techniques may be used to achieve substantially similar results. The road-friction coefficient computation 220 includes one or more modules for update factor computation 222, a road-friction coefficient update 224, and enable learning 226.

Figure 5:
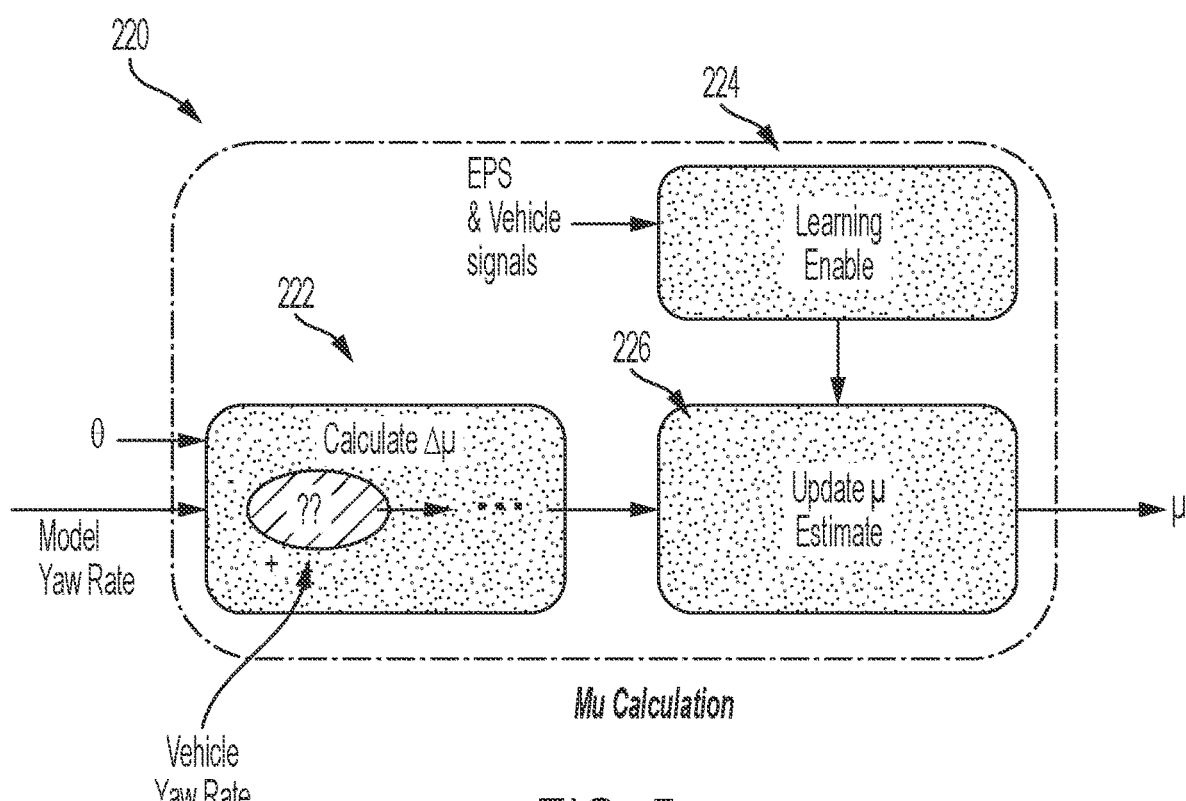
FIG. 5 generally illustrates a block diagram of a portion of a steering system according to the principles of the present disclosure.

As is generally illustrated in FIG. 5, the update factor computation 222 computes a difference (e1) between the two input yaw rates. (e.g., the model yaw rate 212 and the yaw rate 232) that are input to the road-friction coefficient computation 220. The road-friction coefficient computation 220 receives the model yaw rate 212 and the vehicle yaw rate 232. The update factor computation 222 may determine an error value e1 according to:

$$\text{YawRate}(\hat{R})_{VehModel} = f(\theta, \beta, U)$$

$$\text{YawRate}(R)_{Meas} = \text{YawRate}_{VehicleBus}$$

$$e_1[n]R_{Meas} - \hat{R}_{VehModel}$$

For example, error e1 is computed based on the difference between the yaw rate model (and/or lateral acceleration) 212 and the yaw rate 232 processed from the sensor module 230. The error e1 is further processed through low pass filter, which is a function of vehicle speed, steering angle, and steering velocity. Additionally, or alternatively, the error e1 may be further processed by applying a dead zone to control the sensitivity to changes in error. The processed error e1 is provided as an input to an LMS filter with a learning coefficient k to obtain the update factor to the road friction coefficient.

In some embodiments, the error e1 is processed to compute an adjusted error value e2. The adjusted error e2 is computed by applying a low pass filter to the e1 value, where the low pass filter is function of the vehicle speed (U), steering angle ($\theta$), and steering velocity.

The difference e2 is used to calculate an update factor ($\Delta\mu 1$) using following calculations:

$$u = \frac{\theta}{\text{constant} + \theta^2}$$

$$\Delta\mu_1 = k \cdot e2 \cdot u$$

Here, u is a system input such as a steering angle, or a function of the steering angle as shown. In some embodiments, u can be computed in a different manner. Further, in the above equations, k is a predetermined value that can be configurable. The update factor computation 222 outputs the update factor $\Delta\mu$ thus calculated.

The road-friction coefficient estimate update 224 receives the update factor as input and sets up a second update value ($\Delta\mu$) for the road-friction coefficient based on the input value and on a learning-enable flag (FlagL) that is output by the enable learning 226.

The enable learning 226 uses vehicle and steering signals to determine if conditions are favorable for updating the road-friction coefficient value. One or more of the following conditions can be used: if vehicle acceleration/deceleration is below a threshold; if steering velocity magnitude is more than a threshold; if steering angle magnitude is more than a threshold; if multiplication of steering angle and steering velocity is more than a threshold; if vehicle is not in oversteer condition, and/or the like.

Determining the oversteer condition may be computed by the steering system 40 or by other modules of the vehicle 100, such as a brake controller (not shown) using suitable techniques. Based on assessment of the one or more above conditions, the enable learning 226 outputs the FlagL, a Boolean output—TRUE indicating favorable conditions to update the road-friction coefficient value and FALSE indicative that the road-friction coefficient value is not to be updated at this time.

The road-friction coefficient update 224 determines the second update factor to make an update to the road-friction coefficient estimate based on the FlagL:

$$\Delta\mu = \begin{cases} \Delta\mu_1 \ldots \ldots & \text{if } Flag_L \text{ is TRUE} \\ 0 \ldots \ldots \ldots & \text{if } Flag_L \text{ is FALSE} \end{cases}$$

The road-friction coefficient value ($\hat{\mu}$ or $\mu_{t+1}$) is updated using the second update factor and the present road-friction coefficient value:

$$\mu_{t+1} = \mu_t + \Delta\mu$$

In some embodiments, as is generally illustrated in FIG. 4, the model yaw rate 212 may be provided to a boost curve 228 for generating a model rack force. The boost curve 228 computes the model rack force using the slip angle $\alpha_f$ and road-friction coefficient ($\mu$) with a nonlinear (Fiala) tire model to calculate lateral tire forces:

$$F_y = \begin{cases} -C_\alpha \tan\alpha + \frac{C_\alpha^2}{3} |\tan\alpha| \tan\alpha \, I_\alpha, & |\alpha| \leq \alpha_{sl} \\ -\frac{1}{I_f} \text{sgn } \alpha, & \text{else} \end{cases}$$

$$\alpha_{sl} = \tanh^{-1}\left(\frac{3}{C_\alpha I_f}\right)$$

$$I_f = \mu \times \text{Vertical load of axle}$$

where $F_y$: tire lateral force, $C_\alpha$: cornering stiffness parameter, $\alpha$: tire slip angle, $I_f$: inverse of maximum lateral tire force which is a function of $\mu$, and $\alpha_{sl}$: sliding slip angle.

The slip angles for front and rear axle can be obtained using equations (shown below). The computed values are filtered using a vehicle speed dependent filter to represent tire relaxation length dynamics. A lagged slip angle (i.e. output of low-pass filter) is used as front or rear tire slip angle in equations mentioned above as well.

$$\alpha_f = \frac{(V + a \cdot r)}{U} - \delta$$

$$\alpha_r = \frac{(V - b \cdot r)}{U}$$

where $\alpha_f$: front axle slip angle, $\alpha_r$: rear axle slip angle, and $\delta$: tire angle. The tire angle is derived from motor angle using kinematic tables or a gain factor.

A scaling module 234 may generate a gain factor using the motor angle and a spring model (e.g., provided by the sensor module 230), or any other model or a lookup table. The gain factor represents jacking torque and other additional torques/ forces that act on the vehicle 100 due to suspension geometry as a function of the motor angle. The model rack force and the gain factor may be used to generate a torque assist for the steering system 40.

Figure 6:
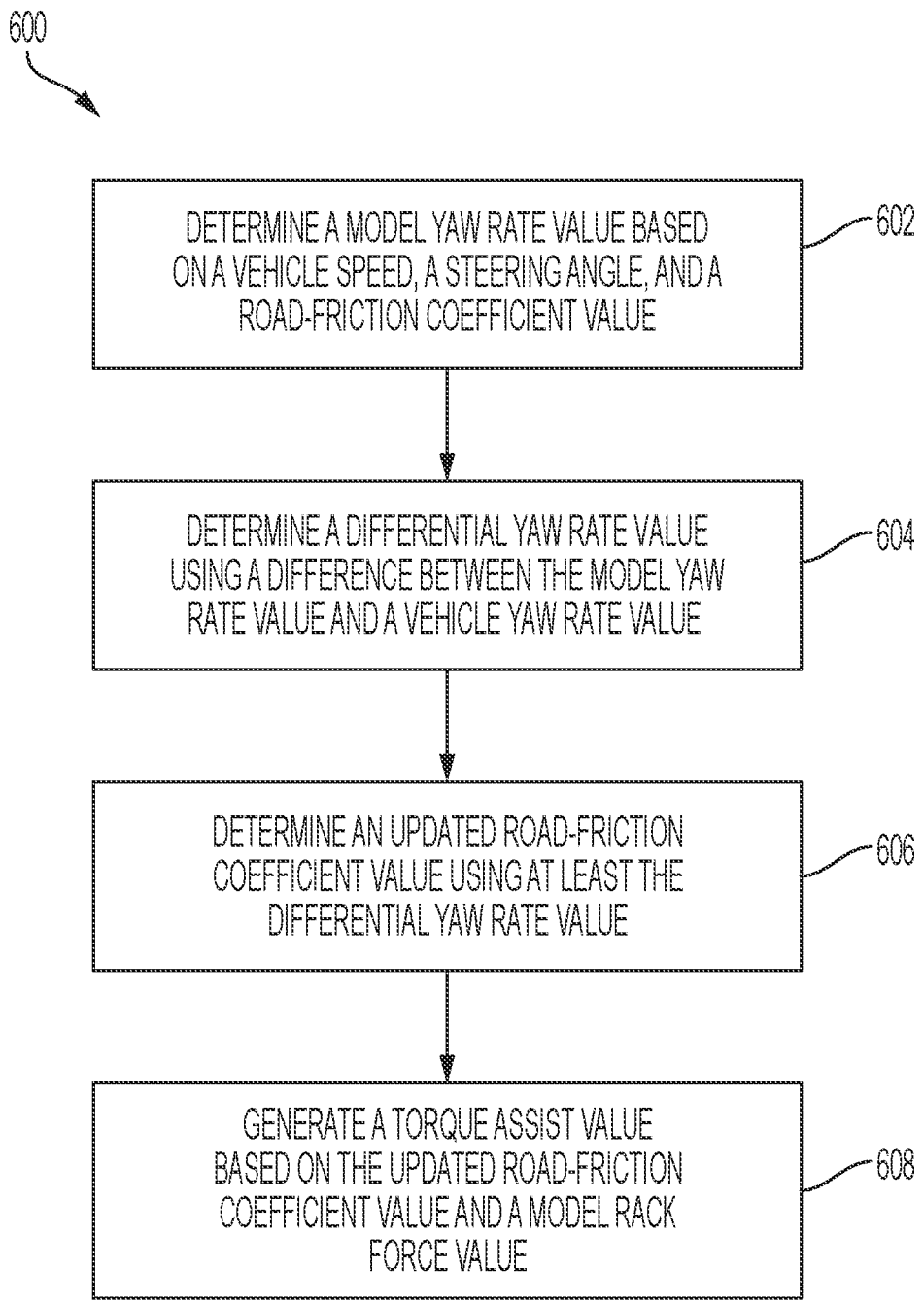
FIG. 6 is a flowchart generally illustrate a method for generating torque assist according to the principles of the present disclosure.

FIG. 6 generally illustrates a flow diagram of a method 600 for determining a road-friction coefficient value according to the principles of the present disclosure. At 602, the method 600 determines a model yaw rate value based on a vehicle speed, a steering angle, and a road-friction coefficient value. For example, the controller 16 may determine a model yaw rate value based on a vehicle speed, a steering angle, and a road-friction coefficient value. In some embodiments, prior to determining the model yaw rate, the controller 16 may determine the road-friction coefficient value based on a first sensor value indicating a first road-friction condition. Additionally, or alternatively, the controller 16 may determine the updated road-friction coefficient value based at least in part on the differential yaw rate value and a second sensor value indicating a second road-friction condition, where the second road-friction condition is different from the first road-friction condition.

At 604, the method 600 determines a differential yaw rate value using a difference between the model yaw rate value and a vehicle yaw rate value. For example, the controller 16 may determine a differential yaw rate value using a difference between the model yaw rate value and a vehicle yaw rate value.

At 606, the method 600 determines an updated road-friction coefficient value using at least the differential yaw rate value. For example, the controller 16 may determine an updated road-friction coefficient value using at least the differential yaw rate value.

In some embodiments, the controller 16 may determine, using one or more adaptive filters, a yaw rate error value used for estimating an error made by a sensor when measuring the vehicle yaw rate value. This may allow the controller 16 to determine the updated road-friction coefficient value based on the differential yaw rate value and the yaw rate error value.

In some embodiments, the controller 16 may determine, using one or more adaptive filters, a lateral acceleration error value used for estimating an error made by a sensor when measuring a lateral acceleration of a vehicle. This allows the controller 16 to determine the updated road-friction coefficient value based on the differential yaw rate value and the lateral acceleration error value.

In some embodiments, the controller 16 may determine, using one or more adaptive filters, a yaw rate error value for estimating a first error made by one or more sensors when measuring the vehicle yaw rate value. Additionally, or alternatively, the controller 16 may determine, using the one or more adaptive filters, a lateral acceleration error value for estimating a second error made by the one or more sensors when measuring a lateral acceleration of a vehicle. This allows the controller 16 to determine the updated road-friction coefficient value based on the differential yaw rate value, the yaw rate error value, and the lateral acceleration error value.

In some embodiments, the controller 16 may determine the updated road-friction coefficient value based on a state of an update flag that is set based on one or more steering system signals and vehicle signals. The update flag may be indicative of a torque sensor condition.

At 608, the method 600 generates a torque assist value based on the updated road-friction coefficient value and a model rack force value. For example, the controller 16 may generate a torque assist value based on the updated road-friction coefficient value and a model rack force value.

In some embodiments, the controller 16 may communicate the updated road-friction coefficient value to an advanced driver-assistance system. In response to a determination that a difference between the road-friction coefficient value and the updated road-friction coefficient is greater than a threshold, the controller 16 may adjust a steering system maneuver value. In some embodiments, the controller 16 may instruct another device or component to adjust the steering system maneuver value.

In some embodiments, a method for generating torque assist includes determining a model yaw rate value based on a vehicle speed, a steering angle, and a road-friction coefficient value and determining a differential yaw rate value using a difference between the model yaw rate value and a vehicle yaw rate value. The method also includes determining an updated road-friction coefficient value using at least the differential yaw rate value and generating a torque assist value based on the updated road-friction coefficient value and a model rack force value.

In some embodiments, determining the updated road-friction coefficient value further includes determining, using one or more adaptive filters, a yaw rate error value corresponding to an estimated sensor error associated with measuring the vehicle yaw rate value and determining the updated road-friction coefficient value based on the differential yaw rate value and the yaw rate error value. In some embodiments determining the updated road-friction coefficient value further includes determining, using one or more adaptive filters, a lateral acceleration error value corresponding to an estimated sensor error associated with measuring a lateral acceleration of a vehicle and determining the updated road-friction coefficient value based on the differential yaw rate value and the lateral acceleration error value. In some embodiments, determining the updated road-friction coefficient value further includes determining, using one or more adaptive filters, a yaw rate error value corresponding to a first estimated sensor error associated with measuring the vehicle yaw rate value, determining, using the one or more adaptive filters, a lateral acceleration error value corresponding to a second estimated sensor error associated with measuring a lateral acceleration of a vehicle, and determining the updated road-friction coefficient value based on the differential yaw rate value, the yaw rate error value, and the lateral acceleration error value. In some embodiments, the method also incudes, prior to determining the model yaw rate value, determining the road-friction coefficient value based on a first sensor value indicating a first road-friction condition. In some embodiments, determining the updated road-friction coefficient value includes determining the updated road-friction coefficient value based at least in part on the differential yaw rate value and a second sensor value indicating a second road-friction condition, the second road-friction condition being different than the first road-friction condition. In some embodiments, the updated road-friction coefficient value is determined based on a state of an update flag, the update flag being set based on at least one steering system signal. In some embodiments, the update flag is indicates a torque sensor condition. In some embodiments, the method also includes communicating the updated road-friction coefficient value to an advanced driver-assistance system. In some embodiments, the method also includes, in response to a determination that a difference between the road-friction coefficient value and the updated road-friction coefficient value is greater than a threshold, adjusting a steering system maneuver value.

In some embodiments, a system for generating torque assist includes a processor and a memory. The memory includes instructions that, when executed by the processor, cause the processor to: determine a model yaw rate value based on a vehicle speed, a steering angle, and a road-friction coefficient value; determine a differential yaw rate value using a difference between the model yaw rate value and a vehicle yaw rate value; determine an updated road-friction coefficient value using at least the differential yaw rate value; and generate a torque assist value based on the updated road-friction coefficient value and a model rack force value.

In some embodiments, the instructions further cause the processor to determine, using one or more adaptive filters, a yaw rate error value corresponding to an estimated sensor error associated with measuring the vehicle yaw rate value and determine the updated road-friction coefficient value based on the differential yaw rate value and the yaw rate error value. In some embodiments the instructions further cause the processor to determine, using one or more adaptive filters, a lateral acceleration error value corresponding to an estimated sensor error associated with measuring a lateral acceleration of a vehicle and determine the updated road-friction coefficient value based on the differential yaw rate value and the lateral acceleration error value. In some embodiments, the instructions further cause the processor to determine, using one or more adaptive filters, a yaw rate error value corresponding to a first estimated sensor error associated with measuring the vehicle yaw rate value, determine, using the one or more adaptive filters, a lateral acceleration error value corresponding to a second estimated sensor error associated with measuring a lateral acceleration of a vehicle, and determine the updated road-friction coefficient value based on the differential yaw rate value, the yaw rate error value, and the lateral acceleration error value. In some embodiments, the instructions further cause the processor to, prior to determining the model yaw rate value, determine the road-friction coefficient value based on a first sensor value indicating a first road-friction condition. In some embodiments, the instructions further cause the processor to determine the updated road-friction coefficient value based at least in part on the differential yaw rate value and a second sensor value indicating a second road-friction condition, the second road-friction condition being different than the first road-friction condition. In some embodiments, the updated road-friction coefficient value is determined based on a state of an update flag, the update flag being set based on at least one steering system signal. In some embodiments, the update flag is indicates a torque sensor condition. In some embodiments, the instructions further cause the processor to communicate the updated road-friction coefficient value to an advanced driver-assistance system.

In some embodiments, an apparatus for generating torque assist, the apparatus comprising a processor and a memory. The memory includes instructions that, when executed by the processor, cause the processor to: determine a model yaw rate value based on a vehicle speed, a steering angle, and a road-friction coefficient value; determine a differential yaw rate value using a difference between the model yaw rate value and a vehicle yaw rate value; determine an updated road-friction coefficient value using the differential yaw rate value and at least one of a yaw rate error value and a lateral acceleration error value; generate a torque assist value based on the updated road-friction coefficient value and a model rack force value; and, in response to a determination that a difference between the road-friction coefficient value and the updated road-friction coefficient value is greater than a threshold, adjust a steering system maneuver value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for generating torque assist, the method comprising:
   determining a model yaw rate value based on a slip angle, a vehicle speed, a steering angle, and a road-friction coefficient value, wherein the slip angle is determined using a bicycle model with road-friction dependent nonlinear tire force curves and tire lag dynamics;
   determining a differential yaw rate value using a difference between the model yaw rate value and a vehicle yaw rate value;
   determining an updated road-friction coefficient value using at least the differential yaw rate value, wherein the updated road-friction coefficient value is iteratively determined using; iteratively determined differential yaw rate values; and
   generating a torque assist value based on the updated road-friction coefficient value and a model rack force value.

2. The method of claim 1, wherein determining the updated road-friction coefficient value further includes:
   determining, using one or more adaptive filters, a yaw rate error value corresponding to an estimated sensor error associated with measuring the vehicle yaw rate value; and
   determining the updated road-friction coefficient value based on the differential yaw rate value and the yaw rate error value.

3. The method of claim 1, wherein determining the updated road-friction coefficient value further includes:
   determining, using one or more adaptive filters, a lateral acceleration error value corresponding to an estimated sensor error associated with measuring a lateral acceleration of a vehicle; and
   determining the updated road-friction coefficient value based on the differential yaw rate value and the lateral acceleration error value.

4. The method of claim 1, wherein determining the updated road-friction coefficient value further includes:
   determining, using one or more adaptive filters, a yaw rate error value corresponding to a first estimated sensor error associated with measuring the vehicle yaw rate value;
   determining, using the one or more adaptive filters, a lateral acceleration error value corresponding to a second estimated sensor error associated with measuring a lateral acceleration of a vehicle; and
   determining the updated road-friction coefficient value based on the differential yaw rate value, the yaw rate error value, and the lateral acceleration error value.

5. The method of claim 1, further comprising, prior to determining the model yaw rate value, determining the road-friction coefficient value based on a first sensor value indicating a first road-friction condition.

6. The method of claim 5, wherein determining the updated road-friction coefficient value includes determining the updated road-friction coefficient value based at least in part on the differential yaw rate value and a second sensor value indicating a second road-friction condition, the second road-friction condition being different than the first road-friction condition.

7. The method of claim 1, wherein the updated road-friction coefficient value is determined based on a state of an update flag, the update flag being set based on at least one steering system signal.

8. The method of claim 7, wherein the update flag indicates a torque sensor condition.

9. The method of claim 1, further comprising communicating the updated road-friction coefficient value to an advanced driver-assistance system.

10. The method of claim 1, further comprising, in response to a determination that a difference between the road-friction coefficient value and the updated road-friction coefficient value is greater than a threshold, adjusting a steering system maneuver value.

11. A system for generating torque assist, the system comprising:
   a processor; and
   a memory including instructions that, when executed by the processor, cause the processor to:
      determine a model yaw rate value based on a slip angle, a vehicle speed, a steering angle, and a road-friction coefficient value, wherein the slip angle is determined using a bicycle model with road-friction dependent nonlinear tire force curves and tire lag dynamics;
      determine a differential yaw rate value using a difference between the model yaw rate value and a vehicle yaw rate value;
      determine an updated road-friction coefficient value using at least the differential yaw rate value, wherein the updated road-friction coefficient value is iteratively determined using iteratively determined differential yaw rate values; and
   generate a torque assist value based on the updated road-friction coefficient value and a model rack force value.

12. The system of claim 11, wherein the instructions further cause the processor to:
   determine, using one or more adaptive filters, a yaw rate error value corresponding to an estimated sensor error associated with measuring the vehicle yaw rate value; and
   determine the updated road-friction coefficient value based on the differential yaw rate value and the yaw rate error value.

13. The system of claim 11, wherein the instructions further cause the processor to:
   determine, using one or more adaptive filters, a lateral acceleration error value corresponding to an estimated sensor error associated with measuring a lateral acceleration of a vehicle; and determine the updated road-friction coefficient value based on the differential yaw rate value and the lateral acceleration error value.

14. The system of claim 11, wherein the instructions further cause the processor to:
   determine, using one or more adaptive filters, a yaw rate error value corresponding to a first estimated sensor error associated with measuring the vehicle yaw rate value;
   determine, using the one or more adaptive filters, a lateral acceleration error value corresponding to a second estimated sensor error associated with measuring a lateral acceleration of a vehicle; and
   determine the updated road-friction coefficient value based on the differential yaw rate value, the yaw rate error value, and the lateral acceleration error value.

15. The system of claim 11, wherein the instructions further cause the processor to, prior to determining the model yaw rate value, determine the road-friction coefficient value based on a first sensor value indicating a first road-friction condition.

16. The system of claim 15, wherein the instructions further cause the processor to determine the updated road-friction coefficient value based at least in part on the differential yaw rate value and a second sensor value indicating a second road-friction condition, the second road-friction condition being different than the first road-friction condition.

17. The system of claim 11, wherein the updated road-friction coefficient value is determined based on a state of an update flag, the update flag being set based on at least one steering system signal.

18. The system of claim 17, wherein the update flag indicates a torque sensor condition.

19. The system of claim 11, wherein the instructions further cause the processor to communicate the updated road-friction coefficient value to an advanced driver-assistance system.

20. An apparatus for generating torque assist, the apparatus comprising:
   a processor; and
   a memory including instructions that, when executed by the processor, cause the processor to:
      determine a model yaw rate value based on a slip angle, a vehicle speed, a steering angle, and a road-friction coefficient value, wherein the slip angle is determined using a bicycle model with road-friction dependent nonlinear tire force curves and tire lag dynamics;
      determine a differential yaw rate value using a difference between the model yaw rate value and a vehicle yaw rate value;
      determine an updated road-friction coefficient value using the differential yaw rate value and at least one of a yaw rate error value and a lateral acceleration error value, wherein the updated road-friction coefficient value is iteratively determined using iteratively determined differential yaw rate values;
      generate a torque assist value based on the updated road-friction coefficient value and a model rack force value; and
      in response to a determination that a difference between the road-friction coefficient value and the updated road-friction coefficient value is greater than a threshold, adjust a steering system maneuver value.

\* \* \* \* \*